(12) United States Patent
Gissler

(10) Patent No.: US 11,643,903 B2
(45) Date of Patent: May 9, 2023

(54) REDUCING MAGNETIC HYSTERESIS OF A POSITION SENSOR ASSEMBLY

(71) Applicant: Halliburton Energy Services, Inc., Houston, TX (US)

(72) Inventor: Robert William Gissler, Spring, TX (US)

(73) Assignee: Halliburton Energy Services, Inc., Carrollton, TX (US)

(*) Notice: Subject to any disclaimer, the term of this patent is extended or adjusted under 35 U.S.C. 154(b) by 641 days.

(21) Appl. No.: 16/674,038

(22) Filed: Nov. 5, 2019

(65) Prior Publication Data
US 2021/0131220 A1 May 6, 2021

(51) Int. Cl.
| | | |
|---|---|---|
| E21B 49/06 | (2006.01) | |
| E21B 34/00 | (2006.01) | |
| F16K 31/06 | (2006.01) | |
| G01D 5/14 | (2006.01) | |
| G01D 5/165 | (2006.01) | |

(52) U.S. Cl.
CPC ............. *E21B 34/00* (2013.01); *F16K 31/06* (2013.01); *G01D 5/145* (2013.01); *G01D 5/165* (2013.01)

(58) Field of Classification Search
CPC .... B01F 33/452; E21B 47/09; E21B 2200/06; E21B 34/06; G01D 2205/70; G01D 2205/73; G01D 2205/77; G01D 2205/775; F16K 31/086
See application file for complete search history.

(56) References Cited

U.S. PATENT DOCUMENTS

| 3,908,959 A * | 9/1975 | Fichtner | F16K 31/048 251/65 |
| 6,411,081 B1 * | 6/2002 | Spellman | G01D 5/24428 324/207.21 |
| 7,538,546 B2 * | 5/2009 | Patland | H01F 7/0273 324/210 |
| 8,125,218 B2 * | 2/2012 | Lackey | G01D 5/145 324/207.2 |

(Continued)

FOREIGN PATENT DOCUMENTS

| JP | H11281308 A | 10/1999 |
| WO | 9817974 A1 | 4/1998 |

(Continued)

*Primary Examiner* — Kipp C Wallace
(74) *Attorney, Agent, or Firm* — Scott Richardson; Parker Justiss, P.C.

(57) ABSTRACT

This disclosure presents an apparatus to improve the indication of an amount that a fluid valve is opened. The fluid control assembly includes an improved position sensor assembly (PSA), where the PSA uses rollers rather than sliding within the PSA housing. The rollers, which can be wheels, ball bearings, and other types of rolling devices, can reduce the friction experienced by the moving component within the PSA. Since the PSA mechanism can move with less friction, the coupled valve magnetic assembly (VMA) can also be enhanced. The VMA can utilize magnets in orientations that enhance the magnetic tensile and compressive forces. For example, some magnets in the VMA can be in a perpendicular orientation to improve directional control and some magnets can be in an angled orientation to reduce the spread of the magnetic field flux lines between the magnets of the VMA and the magnets of the PSA.

9 Claims, 10 Drawing Sheets

(56) References Cited

U.S. PATENT DOCUMENTS

| | | | |
|---|---|---|---|
| 2004/0084189 A1 | 5/2004 | Hosie et al. | |
| 2005/0238540 A1* | 10/2005 | Swon | B01F 31/441 |
| | | | 422/561 |
| 2007/0170914 A1* | 7/2007 | Gissler | E21B 47/09 |
| | | | 324/207.22 |
| 2007/0289734 A1* | 12/2007 | McDonald | E21B 34/06 |
| | | | 166/66.5 |
| 2008/0211522 A1 | 9/2008 | Mohr et al. | |
| 2009/0071717 A1* | 3/2009 | Gissler | E21B 47/09 |
| | | | 175/45 |
| 2010/0000731 A1* | 1/2010 | Gordon | E21B 49/08 |
| | | | 166/264 |
| 2012/0032099 A1* | 2/2012 | Vick, Jr. | E21B 34/10 |
| | | | 251/65 |

FOREIGN PATENT DOCUMENTS

| | | |
|---|---|---|
| WO | 93093682 A1 | 11/2003 |
| WO | 2007084132 A1 | 7/2007 |
| WO | 2009038578 A2 | 3/2009 |
| WO | 2009038590 A1 | 3/2009 |

\* cited by examiner

US 11,643,903 B2

REDUCING MAGNETIC HYSTERESIS OF A POSITION SENSOR ASSEMBLY

TECHNICAL FIELD

This application is directed, in general, to using a downhole well system fluid valve and, more specifically, to utilizing a position sensor assembly to indicate an amount a fluid valve is opened.

BACKGROUND

It is important to accurately indicate an amount a fluid valve is opened within a hydrocarbon well system since fluid flow through the fluid valve can impact the development and production of the borehole. When the fluid valve position is set to allow a larger or smaller flow of fluid than intended, the development and production of the well system can be negatively impacted. Conventionally, coupled to the fluid valve is a valve magnetic assembly (VMA) and a position sensor assembly (PSA). As the fluid valve opens and closes, the VMA moves linearly. A sub-assembly within the PSA moves proportionally with the VMA and indicates the amount the fluid valve is opened.

Typically, magnets are utilized to couple the PSA to the VMA and as the VMA moves, the magnets can cause a movement of a sliding component within the PSA. Due to the way the magnetic force is applied between the VMA and PSA, there can be a delay in movement of the slider mechanism within the PSA. This can be seen in various movements of the fluid valve, such as when movement of the fluid valve changes direction. For example, when the fluid valve changes from opening the valve to partially closing the valve. The delay in the movement of the slider mechanism can manifest itself as an incorrect position indication that indicates an incorrect amount the fluid valve is opened. The delay can be at least partially attributed to magnetic hysteresis and friction.

To correct for this imprecise movement of the PSA sliding mechanism, the fluid control valve is often recalibrated, such as moving the valve to the fully closed position and then reopening the fluid valve to the desired opened position. This re-calibration action typically results in an increase in time needed to change the amount the fluid valve is open and can adversely affect operating costs.

SUMMARY

The disclosure provides an apparatus to indicate a position of a moving mechanism. In one example, the apparatus includes: (1) a position sensor assembly (PSA) housing, (2) a PSA sub-assembly housed by the PSA housing, and (3) a roller set, attached to the PSA sub-assembly, wherein the roller set enables the PSA sub-assembly to roll within the PSA housing, and the roller set comprises one or more rollers.

The disclosure also provides a system to indicate an amount a fluid valve, of a fluid control assembly, is opened. In one example, the system includes: (1) a valve magnetic assembly (VMA), operable to move proportionally with the fluid valve, using linear movement, wherein the fluid control assembly is located in a borehole of a well system, and (2) a PSA, operable to house a PSA sub-assembly that is magnetically coupled to the VMA, indicate a position of the VMA, and move utilizing rollers.

The disclosure further provides a method to construct a fluid control assembly to be utilized in a borehole, to indicate position of a fluid valve. In one example, the method includes: (1) coupling a set of VMA magnets with a set of PSA magnets, wherein the VMA moves proportionally with the fluid valve utilizing linear movement, (2) utilizing rollers on a sub-assembly of the PSA, and (3) indicating a position of the fluid valve utilizing the sub-assembly of the PSA, wherein the VMA magnets and the PSA magnets are magnetically coupled.

BRIEF DESCRIPTION

Reference is now made to the following descriptions taken in conjunction with the accompanying drawings, in which.

DETAILED DESCRIPTION

Figure 1A:
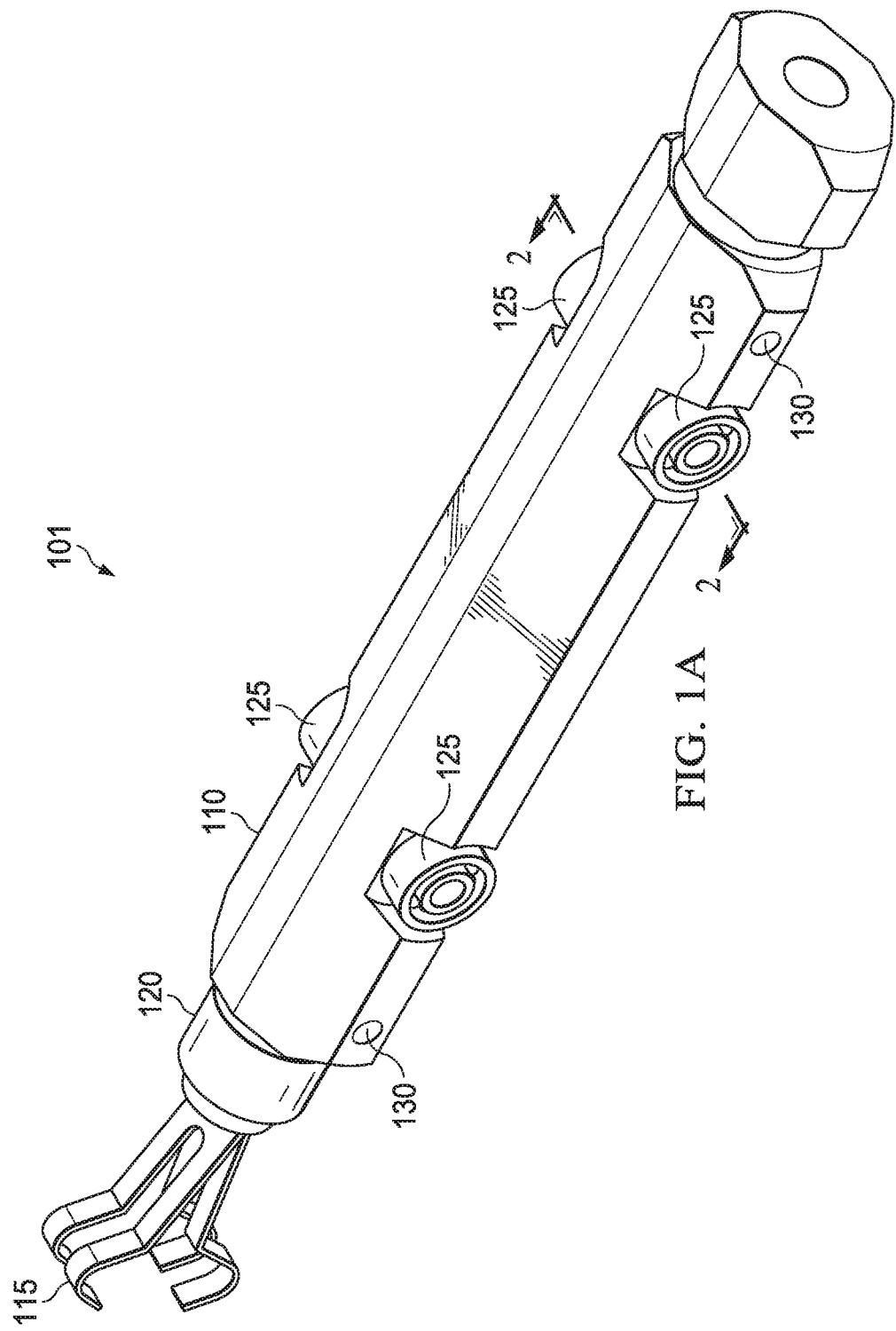
FIG. 1A is an illustration of a diagram of an example exterior portion of a position sensor assembly (PSA) sub-assembly.

In the hydrocarbon production industry, there is a need to pump fluid into a borehole location of a well system or to extract fluid from the borehole location. The well systems can be of various types and be at various stages of completion, such as logging while drilling (LWD), measure while drilling (MWD), hydraulic fracturing (HF), injection wells, and completed wells. The fluid, when pumped into, e.g., injected into, the borehole location, can be of various kinds of well system muds, fracturing fluids, hydraulic fluids, and other fluid types. The fluid, when pumped out of, e.g., extracted from, the borehole, can be of various kinds of well system muds, fracturing fluids, hydrocarbons such as oil and gas, and other fluid types.

In one or more embodiments, pumping fluid into or out of a borehole location can be accomplished by lowering a fluid pipe into the borehole with a fluid control valve system attached at the end of the fluid pipe that is inserted into the borehole. The other end of the fluid pipe can be coupled to another system or to surface equipment, such as a well site pump system. In an alternate aspect, a local pumping system can be utilized, where the local pumping system can be positioned with the borehole, such as using a sampling tool. In this aspect, the fluid pipe would the portion of the local pumping system leading from a storage tank to the subterranean formation. The fluid control valve system can include various components to control the flow of fluid into or out of the fluid pipe. For example, in an injection well scenario, the fluid control valve system can control the volume and pressure of the fluid being injected, where the volume and pressure are determined by a well site job plan.

The fluid control valve system can be communicatively coupled with other systems, such as other downhole tools, a bottom hole assembly (BHA), or with surface equipment, for example, a well site controller. The fluid control valve system can receive instructions from one or more of these other systems, such as to open the fluid valve to the 50% open mark or to close the fluid valve to the 33% open mark. The fluid control valve system can communicate data to the other systems, such as the currently detected amount that the fluid valve is opened. The fluid valve may not exactly match the instructed opening amount for various reasons, such as a blockage, friction, or an error tolerance of the indicator device.

The fluid control valve system can be a fluid control assembly including a fluid valve coupled to the fluid pipe, a valve magnetic assembly (VMA), and a position sensor assembly (PSA). Typically, the VMA is mechanically coupled to the fluid valve and, using linear movement, moves proportionally with the amount the fluid valve is opened. The PSA further includes a sub-assembly that moves within the housing of the PSA where the sub-assembly is magnetically coupled to the VMA. The PSA sub-assembly provides the indicator of the amount the fluid valve is opened, such as by using a resistive electrical circuit within the PSA sub-assembly, where the PSA sub assembly position information can be communicated to other systems. As the fluid valve opens or closes, the VMA moves, which then causes the PSA sub-assembly to move. In some aspects, when the PSA sub-assembly indicates a specified position has been reached, it can instruct the fluid valve to stop its valve movement.

In conventional fluid control assemblies, there can be variations in the movement of the PSA sub-assembly. The variations can be due to the magnetic coupling between the PSA sub-assembly and the VMA, as well as the mechanical forces that oppose a shift in direction of the PSA sub-assembly. The magnetic coupling is not rigid so when there is a direction shift, the magnetic force change can have a slow band or a dead band as the magnetic field flux lines are shifting direction. The magnetic field flux lines can also be affected by the air gap between the magnet sets, the size of the magnets, such as the outside diameter (OD) and lengths, and the size and position of the magnetic field flux spacers which direct and focus the magnetic field flux lines. A mechanical force that resists the direction shift can be the friction force inside the PSA between the sub-assembly and the surfaces on the inside, stationary part, of the PSA housing.

The slow band, dead band, and the magnetic field flux lines can be influenced by the magnetic hysteresis property of magnets. Magnetic hysteresis can be a primary concern as it can lead to a delay in movement of the PSA sub-assembly as compared to the movement of the VMA. This can lead to reduced accuracy in or incorrect positioning data being communicated. Conventionally, to re-calibrate the PSA sub-assembly, the fluid valve is fully closed and then reopened at the new desired point. This has the effect of calibrating the PSA sub-assembly with the fluid valve. The described cycling of the fluid valve can take one to two minutes, which can impact the production of the well system. As well operators are fine tuning the fluid flow into or out of the borehole, multiple changes to the fluid valve can be communicated to the fluid control assembly; hence the frequent re-calibration of the PSA sub-assembly can impact the operations of the well system.

This disclosure presents an apparatus and system that can improve the responsiveness of the PSA sub-assembly in response to the linear movement of the VMA. The improvement can be realized by allowing for the direct movement of the fluid valve to a specified opening amount rather than closing the fluid valve and reopening to the desired opening amount. The fluid valve can be directed to open or close a specified amount without the need for frequent re-calibration. The reduction in time to adjust the fluid valve can vary due to the fluids used, the distance from the pump system to the fluid valve, and environmental factors at the fluid valve location. For example, the reduction in time can be 50% to 70%. By reaching a specified amount for the fluid valve to be opened in either movement direction, operational time and costs can be reduced.

The PSA sub-assembly can be modified from using a slider type of movement to a rolling type of movement. The sliders of the PSA sub-assembly can be replaced by rollers, such as rollers with an outside diameter (OD) of 1.5 millimeters (mm). The rollers can be slider bearings, ball bearings, and other types of rolling mechanisms, and be coupled to the PSA sub-assembly using conventional techniques. The use of rollers can reduce the friction experienced by the PSA sub-assembly as it moves back and forth within the PSA housing as compared to the previous sliding mechanism. For example, the sliding friction coefficient range can be approximately 0.1 to 0.2, compared to the rolling friction coefficient range that can be approximately 0.02 to 0.05. With the lower friction coefficient for rollers, the magnetic coupling force can be reduced while maintaining or improving the accuracy of the position sensing.

In another aspect, the use of the roller mechanism allows for a higher magnetic coupling force between the PSA sub-assembly and the VMA. For example, the average residual magnetism across the air gaps can be greater than approximately 0.5 kilogauss. The higher magnetic coupling force can beneficially increase the magnetic field flux line density. In PSA slider sub-assemblies, the use of higher magnetic coupling force could increase the friction between the side of the PSA housing and the PSA slider sub-assembly, causing movement issues of the PSA slider sub-assembly. The use of rollers can reduce this issue.

In another aspect, the magnetic coupling force geometry can be modified to optimize the magnetic tensile strength and the magnetic compressive strength between the VMA and the PSA sub-assembly. The residual magnetism and magnetic coupling forces can be optimized in conjunction with the reduction of friction using rollers, such that the accuracy can be improved, for example by a factor of two. The magnets within the VMA can be oriented, i.e., positioned, differently than conventional placement since the rollers reduce the friction constraint present in the previous PSA sub-assemblies. In some aspects, the side VMA magnets can be placed further apart from the center VMA magnet than in conventionally constructed fluid control assemblies, where the distance can be optimized with the residual magnetism and the magnetic coupling forces. Additional magnet sets can be present as well. In another aspect, larger magnets, as compared to those used conventionally, can be used within the VMA to increase the magnetic field flux density over part of the PSA sub-assembly. For example, the residual magnetism across the air gaps can be increased by 10.0% to 20.0%, though the increase can vary outside of this range according to the optimizations to improve the accuracy. The increase in magnetic field flux density can lead to optimizing the magnetic tensile force and the magnetic compressive forces.

In another aspect, the VMA magnets can be angled to provide a higher magnetic compressive force on the PSA sub-assembly which in turn can reduce the movement lag time, hence reduce the effect of the magnetic hysteresis. For example, the leftmost and rightmost magnet sets in the VMA can be angled so that the respective magnetic pole surface facing the PSA can be turned partially toward the center magnet set of the VMA. The increase in magnetic compressive strength with the PSA sub-assembly can be balanced against the magnetic force lost to the magnetic coupling with the center magnet set of the VMA. Too much magnetic force loss to the center magnet set of the VMA can reduce the effectiveness of the magnetic coupling with the PSA sub-assembly.

Turning now to the figures, FIG. 1A is an illustration of a diagram of an example exterior portion of a PSA sub-assembly 101 demonstrating an embodiment constructed to the principles of the disclosure. PSA sub-assembly 101 is located internal of a PSA housing and can move linearly within the housing for a prescribed distance. The travel distance of PSA sub-assembly 101 can be typically about 6 inches (approximately 15.24 centimeters), with the unit itself being about 9-10 inches (approximately 22.86 centimeters to 25.4 centimeters) in length. In other aspects, PSA sub-assembly 101 can travel a greater or lesser distance, and can be of various lengths.

PSA sub-assembly 101 has a housing 110. On one end of PSA sub-assembly 101 is one or more electrical contacts 115. Electrical contacts 115 are intended to maintain contact with elements of an electrical circuit, such as electrical contacts within the PSA housing (see FIG. 2). Electrical contacts 115 can complete an electrical circuit that can be measured thereby providing position information of PSA sub-assembly 101, where the PSA is part of the electrical circuit and acts as a linear potentiometer. Connecting electrical contacts 115 to housing 110 is a shrink ring 120.

Attached to housing 110 are four rollers 125. In other aspects, there can be fewer or additional rollers attached to housing 110. Also attached to housing 110 are four bumper guides 130 to help guide PSA sub-assembly 101 back and forth within the PSA. Two bumper guides 130 are shown, with the other two located on the far side of PSA sub-assembly 101 as drawn. In other aspects, there can be fewer or additional bumper guides 130.

Figure 1B:
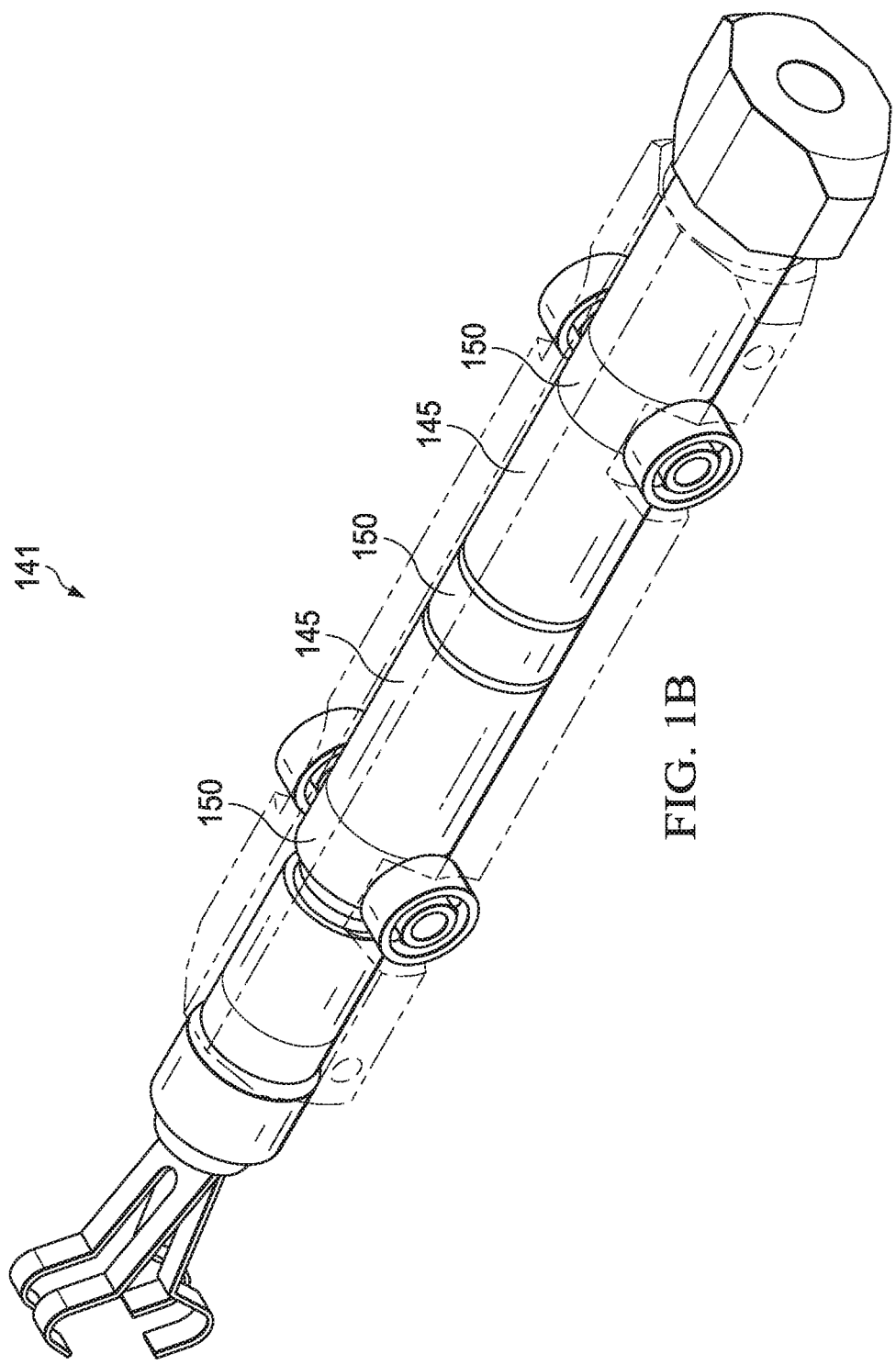
FIG. 1B is an illustration of a diagram of an example interior portion of a PSA sub-assembly.

FIG. 1B is an illustration of a diagram of an example interior portion of a PSA sub-assembly 141 demonstrating an embodiment as constructed according to the principles of the disclosure. PSA sub-assembly 141 can be PSA sub-assembly 101. Magnets 145 are located as part of PSA sub-assembly 141 and used to create the magnetic coupling with the VMA. Three flux spacers 150 are identified as well. Flux spacers 150 provide a gap between the magnet sets within PSA sub-assembly 141 and can focus the magnetic field flux lines.

Figure 2:
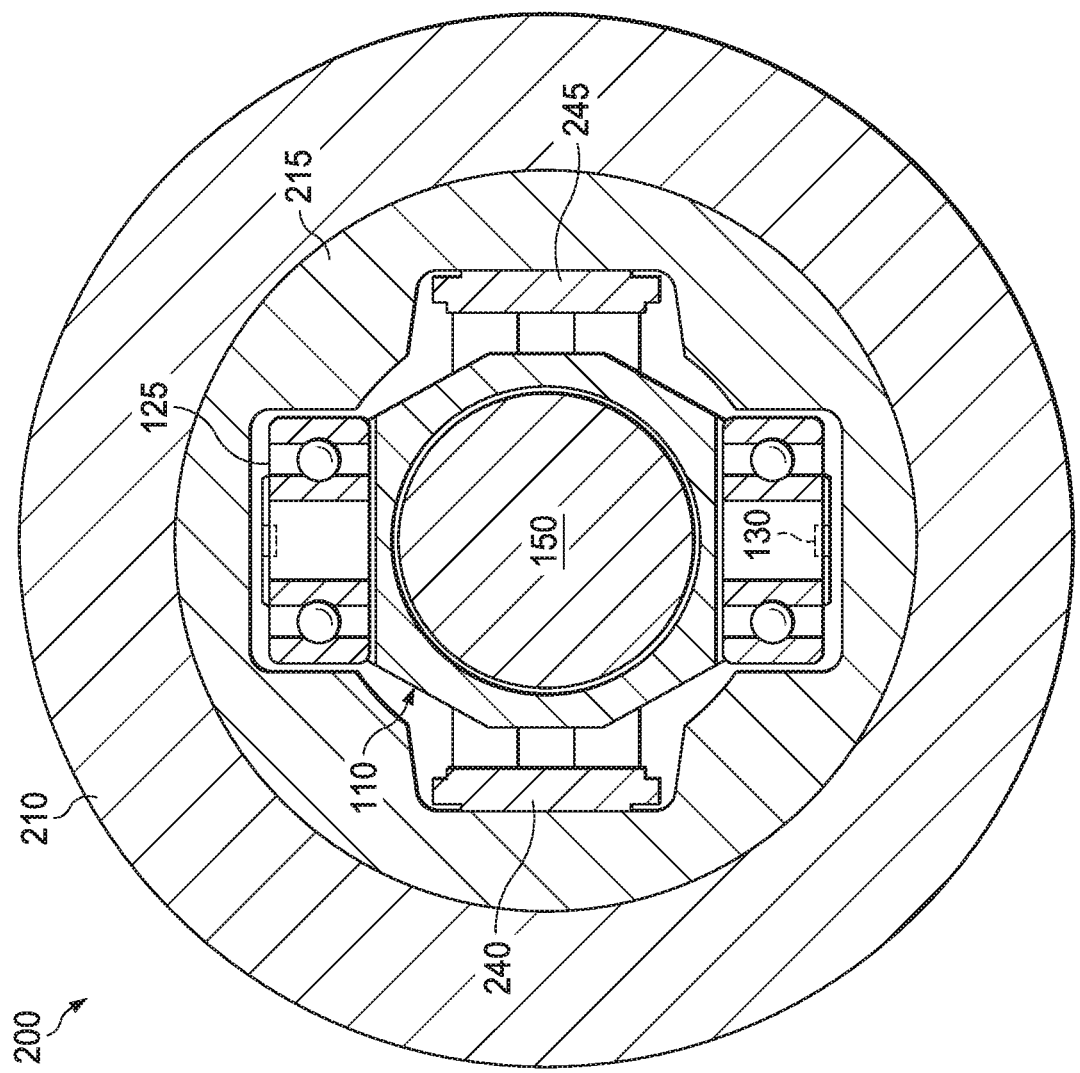
FIG. 2 is an illustration of a diagram of an example cross sectional view of a PSA.

FIG. 2 is an illustration of a diagram of an example cross sectional view 200 of PSA housing 210 and a PSA sub-assembly 110. In some aspects, PSA housing 210 can have an outer diameter (OD) of ¼ of an inch (approximately 0.635 centimeters) and an inside diameter (ID) of 3/16 of an inch (approximately 0.47625 centimeters). Within PSA housing 210 is an electro-mechanical support guide 215. Rollers 125 of PSA sub-assembly 110 can roll on electro-mechanical support guide 215 for the linear travel distance allowed within PSA housing 210.

Flux spacer 150 is shown at one end of PSA sub-assembly 110. Flux spacer 150 can provide magnetic field flux line focusing ability to improve the magnetic coupling with the VMA. Bumper guide 130 is used to guide PSA sub-assembly 110 within electro-mechanical support guide 215.

Conductive element 240 is located at a lateral end of PSA sub-assembly 110, and contacts a first part of electrical contacts 115. In some aspects, conductive element 240 can be the ground path and attached to electro-mechanical support guide 215. Resistive element 245 is located opposite to conductive element 240 and positioned against a different portion of electro-mechanical support guide 215. Resistive element 245 contacts a second part of electrical contacts 115. Resistive element 245 can cause a voltage change in the electrical circuit. The voltage detected can be used to determine the position of PSA sub-assembly 110 and hence the position of the VMA and the amount that the fluid valve is opened.

Figure 3:
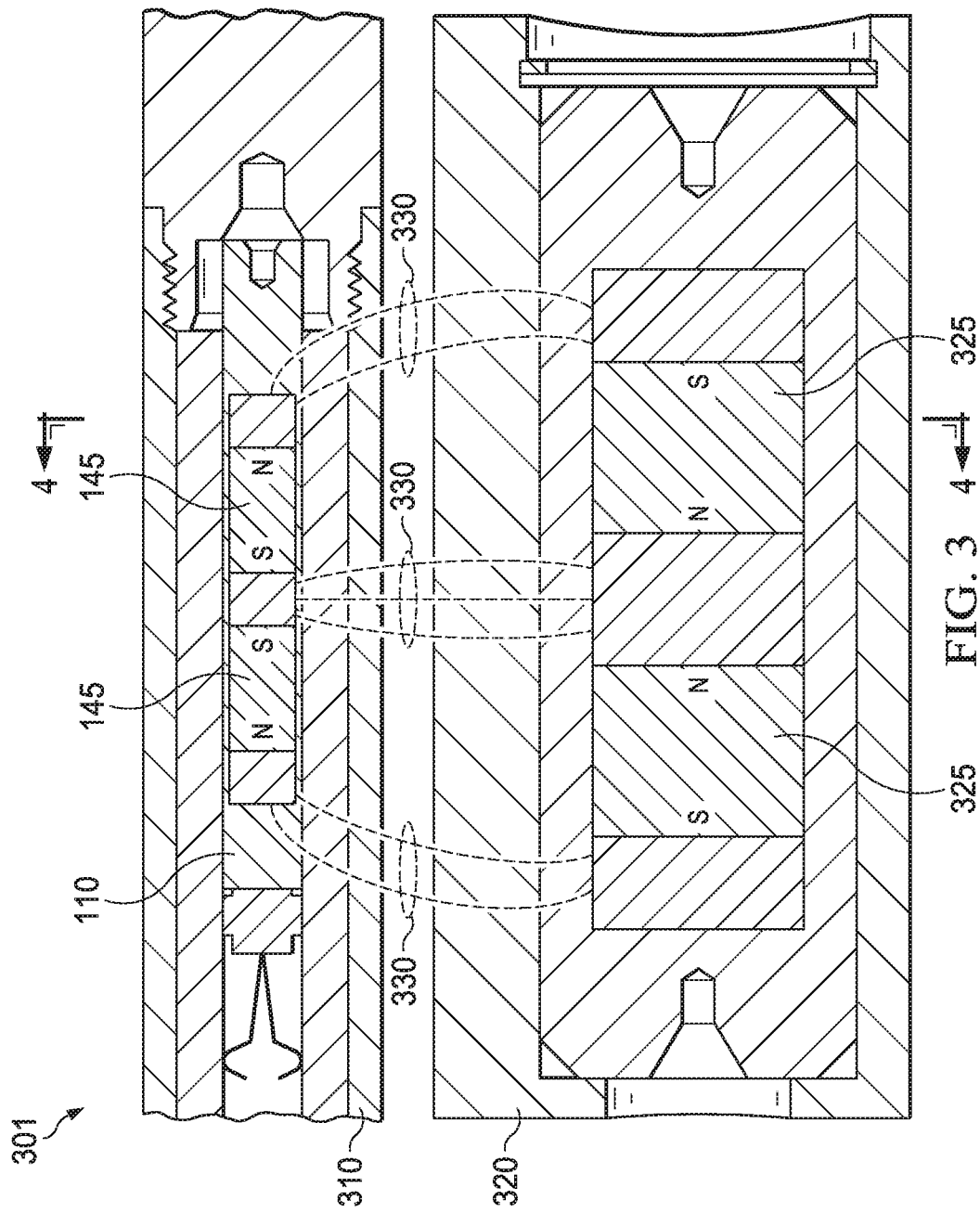
FIG. 3 is an illustration of a diagram of an example PSA/valve magnetic assembly (PSA/VMA) coupling demonstrating simplified magnetic field flux lines.

FIG. 3 is an illustration of a diagram of an example PSA/VMA coupling 301 demonstrating simplified magnetic field flux lines using a PSA sub-assembly constructed according to the principles of the disclosure. PSA/VMA coupling 301 includes a PSA housing 310 with PSA sub-assembly 110 within the housing of PSA housing 310. PSA sub-assembly 110 includes two magnet sets 145 where the magnetic field orientation is represented, by example, as N and S (the orientation can be a reverse orientation as well). Laterally aligned with PSA housing 310 is a VMA 320, which is proximate PSA housing 310. VMA 320 is coupled to a fluid valve (not shown) where VMA 320 can move laterally as the fluid valve is opened and closed. VMA 320 includes two magnet sets 325.

Magnet sets 145 and 325 can include one or more magnets in each magnet set. Magnet sets 145 and 325 are shown with two magnet sets. Fewer or additional magnet sets can be present in PSA sub-assembly 110 or VMA 320.

VMA 320 is magnetically coupled to PSA sub-assembly 110 through a magnetic field represented by magnetic field flux lines 330, connecting magnet sets 145 and magnet sets 325. Magnetic field flux lines 330 are shown for representation purposes. Magnet sets 145 and magnet sets 325 are in a parallel alignment, such that the magnetic poles of magnet sets 145 are aligned parallel to the magnetic poles of respective magnet sets 325, with opposite magnetic fields at the respective ends. This type of alignment allows for magnet sets 145 and magnet sets 325 to be located close to each other, thereby increasing the magnetic tensile and compressive force.

In an alternate aspect, magnet sets 325 can be in a perpendicular alignment with corresponding magnet sets 145, such that the magnetic poles of magnet sets 325 are perpendicular to the magnetic poles of respective magnet sets 145. This type of alignment can allow for an increase in the directional control of PSA sub-assembly 110, as influenced by magnetic field flux lines 330. In another aspect, magnet sets 325 can be mounted within VMA 320 at a distance from each other that is at least the length of PSA sub-assembly 110. Positioning magnet sets 325 at or beyond an end of PSA sub-assembly 110 can improve the movement control of PSA sub-assembly 110 as VMA 320 moves, such as through a faster response to directional changes of VMA 320.

Figure 4:
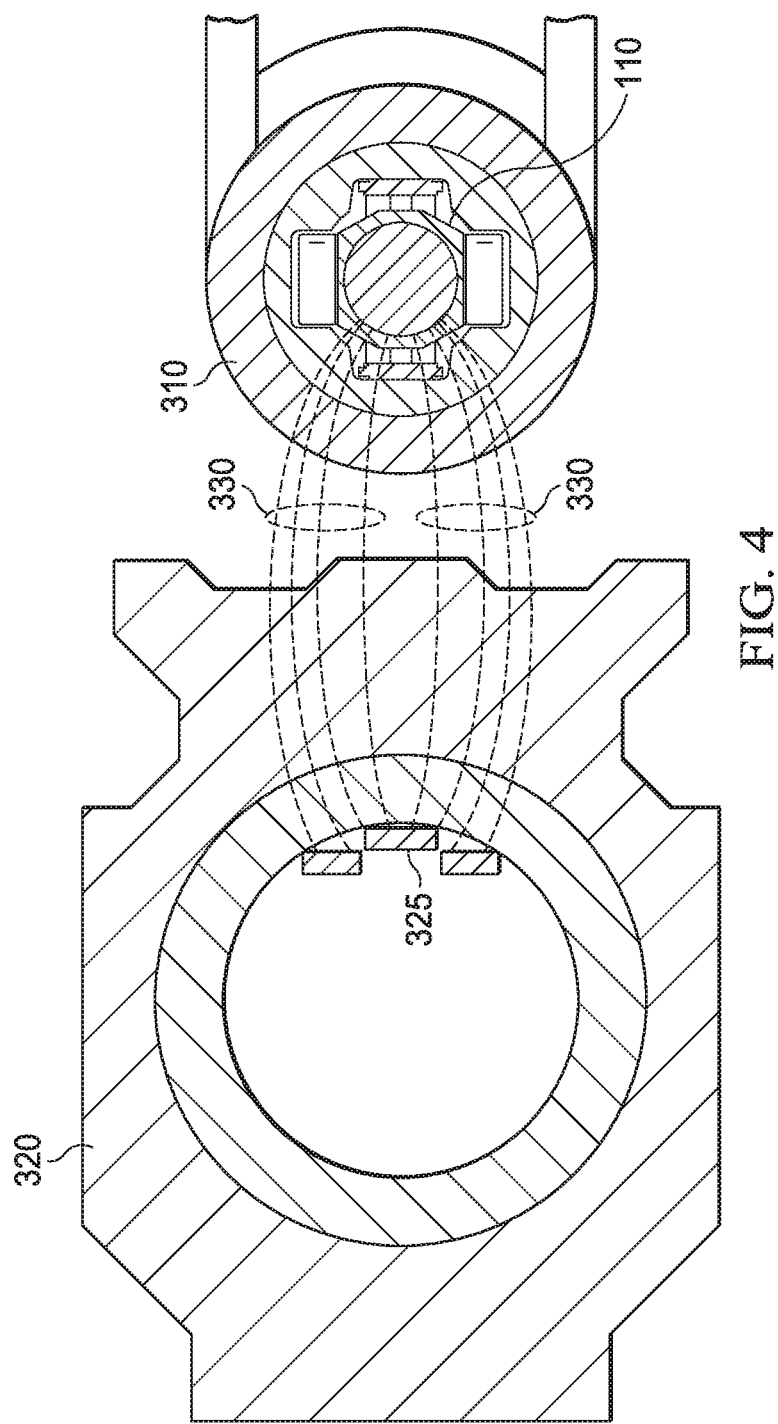
FIG. 4 is an illustration of a diagram of an example cross sectional view of a PSA/VMA coupling demonstrating simplified magnetic field flux lines.

FIG. 4 is an illustration of a diagram of an example cross sectional view of PSA/VMA coupling 301 as indicated in FIG. 3, demonstrating simplified magnetic field flux lines, constructed according to the principles of the disclosure. Cross sectional view of PSA/VMA coupling 301 represents the same alignment of components as demonstrated in FIG. 3. Cross sectional view of PSA/VMA coupling 301 includes PSA 310, PSA sub-assembly 110, and VMA 320.

VMA 320 includes two magnet sets 325. Magnet sets 325 are shown for demonstration purposes; cross sectional view of PSA/VMA coupling 301 would typically have a flux spacer blocking the view of magnet sets 325. PSA sub-assembly 110 includes two magnet sets as well (not shown). Magnet sets 325 and the magnet sets that are part of PSA sub-assembly 110 form magnetic field flux lines 330. The parallel alignment of magnetic sets 325 and the corresponding magnet sets of PSA sub-assembly 110 allow for a minimum distance between the respective magnet sets.

Figure 5:
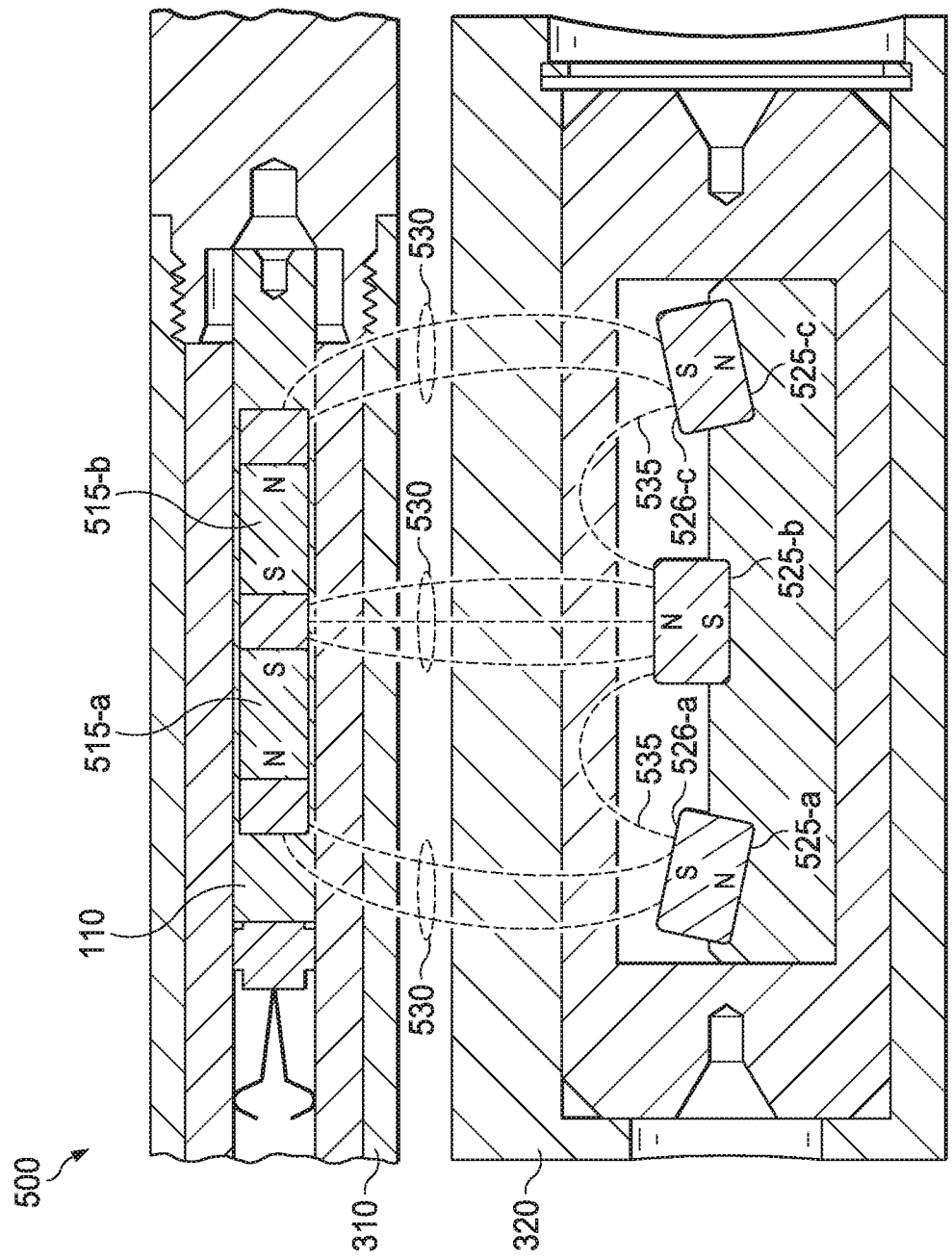
FIG. 5 is an illustration of a diagram of an example PSA/VMA coupling utilizing angled magnet sets.

FIG. 5 is an illustration of a diagram of an example PSA/VMA coupling 500 utilizing magnets sets positioned on an angled axes, i.e., angled magnet sets, which has been constructed according to the principles of the disclosure. PSA/VMA coupling 500 utilizes similar components as FIG. 3 with a change that the magnet sets of the VMA are angled. PSA/VMA coupling 500 includes PSA 310 that houses PSA sub-assembly 110. PSA sub-assembly 110 includes magnet set 145-*a* and 145-*b*, collectively referred to as magnet sets 145, with an example magnetic pole orientation for magnet sets 145 as indicated. Coupled to a fluid valve is VMA 320. VMA 320 includes magnet set 525-*a*, 525-*b*, and 525-*c*, collectively referred to as magnet sets 525, with an example magnetic pole orientation for magnet sets 525 as indicated.

Magnet set 525-*a* is angled so that a top surface 526-*a* of magnet set 525-*a* is angled toward center magnet set 525-*b*. The amount of angle can vary depending on the size of the magnet used and the magnetic force of magnet set 525-*a*, the size of the magnet and magnetic force of the corresponding magnet set 145-*a*, and the amount of tensile and compressive forces desired. Similarly, magnet set 525-*c* is angled so that a top surface 526-*c* of magnet set 525-*c* is tilted approximately the same angle as magnet set 525-*a* but in the opposite direction—relative to a line connecting PSA sub-assembly 110 and VMA 320. For example, magnet set 525-*a* can be angled along an axis that is from 0.0 degrees to 45.0 degrees relative to the horizontal plane formed by PSA 310, where the horizontal plane is perpendicular to a line drawn from VMA 320 to the horizontal plane. Magnet set 525-*c* can be angled along an axis at a negative of the same degree value relative to the horizontal plane so that magnet set 525-*c* is angled in the opposite direction of magnet set 525-*a* along diverging axes. The magnetic forces between magnet sets 145 and magnet sets 525 are shown by magnetic field flux lines 530. Magnetic field flux lines 530 are for representation only and do not reflect the amount or strength of the various magnetic fields. In this example, magnetic field flux lines 530 demonstrate magnet set 525-*a* magnetically coupled to magnet set 145-*a*, magnet set 525-*c* magnetically coupled to magnet set 145-*b*, and magnet set 525-*b* magnetically coupled to a center flux spacer of PSA sub-assembly 110.

Magnet sets 525 have a separate magnetic field flux lines 535 representing the magnetic forces present between magnet set 525-*a* and magnet set 525-*b*, and between magnet set 525-*c* and magnet set 525-*b*. Magnetic field flux lines 535 is present due to the angle of magnet set 525-*a* and magnet set 525-*c*. A balancing is required between (1) increasing the tensile and compressive magnetic forces with magnetic sets 145 due to angled magnet set 525-*a* and magnet set 525-*c*, and (2) the magnetic force generated between magnetic sets 525. Improved performance of PSA sub-assembly 110 can be achieved while some magnetic coupling between magnet set 525-*a*, magnet set 525-*b*, and magnet set 525-*c* is present, for example, represented by magnetic field flux lines 535.

Figure 6:
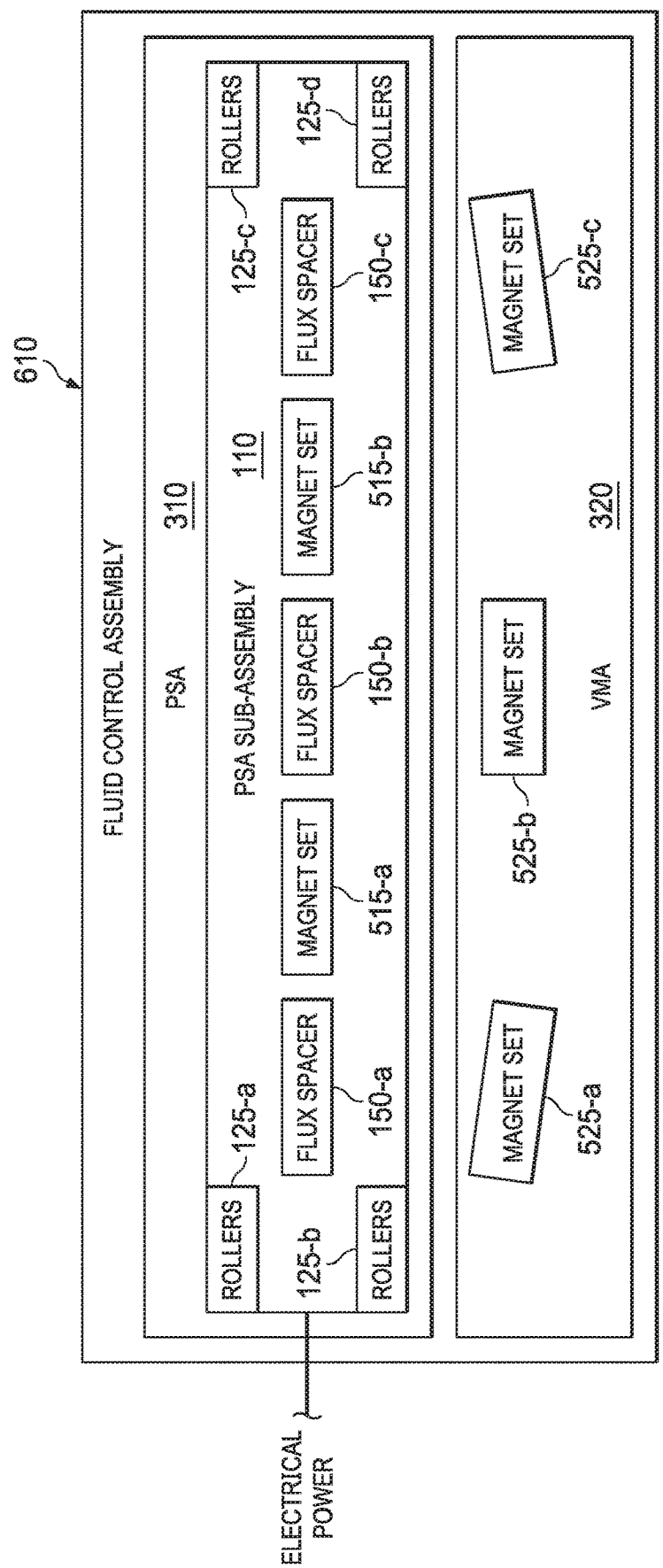
FIG. 6 is an illustration of a block diagram of an example PSA/VMA system.

FIG. 6 is an illustration of a block diagram of an example PSA/VMA system 600. PSA/VMA system 600 can be used as part of a fluid control assembly to indicate the amount a fluid valve is opened, or part of other types of moving mechanisms requiring positional control. For example, a moving mechanism that can benefit from monitoring and verifying positions can be a centralizer arm (such as for wireline and MWD well systems), a bent sub (such as angle extensions and extenders), a fluid injector (such as for wireline, MWD, and completion well systems), a setting tool (such as for completion well systems), and a shifting tool (such as for wireline and completion well systems). The amount the fluid valve is opened can be reported back to the fluid control assembly, well site controller, operator, or engineer so that the fluid valve can be opened or closed by the specified amount. PSA/VMA system 600 includes a fluid control assembly 610, which further includes a fluid valve (not shown), PSA 310, and VMA 320.

PSA 310 includes PSA sub-assembly 110 that can linearly move within the housing of PSA 310. The movement of PSA sub-assembly 110 is indicated through a variation in the resistance in an electrical circuit, utilizing supplied electrical power from PSA 310 and the electrical lines. Using the variable resistance measurement, the amount the fluid valve is opened can be determined and the information can be communicated to one or more systems, for example, a well site controller, a downhole or bottom hole tool assembly, or a well site operator or engineer.

PSA sub-assembly 110 includes roller set 125-*a*, roller set 125-*b*, roller set 125-*c*, and roller set 125-*d* collectively referred to as roller sets 125. Each roller set in roller sets 125 can be one or more rollers, ball bearings, wheels, and other mechanisms that allow PSA sub-assembly 110 to move via a rolling motion and are mounted to PSA sub-assembly 110 using conventional techniques. In other aspects, PSA sub-assembly 110 can have one, two, or more roller sets 125. A sufficient number of roller sets 125 can be included to allow PSA sub-assembly 110 to move while also minimizing the sliding surfaces of PSA sub-assembly 110, such as to the electrical components that slide across an internal surface of PSA 310.

PSA sub-assembly 110 includes magnet set 515-*a* and a magnet set 515-*b* collectively referred to as magnet sets 515, where magnet set 515-*a* and magnet set 515-*b* are members of magnet sets 515. Also included are a flux spacer 150-*a*, a flux spacer 150-*b*, and a flux spacer 150-*c* collectively referred to as flux spacers 150. There can be one or more magnets in each magnet set 515-*a* and 515-*b*. Though two magnet sets 515 are shown, there can be one or more magnet sets in magnet sets 515. Magnet sets 515 are utilized to provide magnetic coupling to VMA 320. Flux spacers 150 direct and focus the magnetic field flux lines between magnet sets 515 and magnets of VMA 320.

VMA 320 includes magnet set 525-*a*, magnet set 525-*b*, and magnet set 525-*c*, collectively referred to as magnet sets 525. Magnet sets 525 are mounted within VMA 320 using conventional techniques, such as with magnetic force, epoxy, glues, adhesives, clips, clamps, other mounting techniques, or a combination thereof. Though three magnet sets 525 are shown, VMA 320 can have one or more magnet sets in magnet sets 525. For example, magnet sets 525 can have four magnet sets. In such an example, two magnet sets can be employed for single magnet set 525-*b*. Multiple magnet sets can be employed for and positioned similarly to each of magnet sets 525. Each magnet set within magnet sets 525 can have one or more magnets of various sizes. Magnet sets 525 provide the magnetic coupling with magnetic sets 515. As VMA 320 moves proportionally to, using linear movement, the amount the fluid valve is opened, PSA sub-assembly 110 is moved proportionally by the magnetic coupling.

Magnet set 525-*a* is shown with its top surface angled toward center magnet set 525-*b*. Magnet set 525-*c* is shown with its top surface angled toward center magnet set 525-*b* using an opposite angle direction from the angle used for magnet set 525-*a*. The angles used are measured from a line from PSA 310 to VMA 320. The angle of magnet set 525-*a* and magnet set 525-*c* can increase the tensile and compressive magnetic forces applied to magnet sets 515, while a small magnetic force can have magnetic coupling with magnet set 525-*b*.

In another aspect, magnet set 525-*a*, magnet set 525-*b*, and magnet set 525-*c* can be parallel to magnet sets 515, such that the magnetic poles of magnet sets 525 are parallel to the magnetic poles of respective magnet sets 515, to minimize the distance between magnet sets 515 and magnet sets 525. This minimization can increase the magnetic force between magnet sets 515 and magnet sets 525. In another aspect, magnet sets 525 can be perpendicular to magnet sets 515, such that the magnetic poles of magnet sets 525 are perpendicular to the magnetic poles of respective magnet sets 515. The perpendicular alignment can allow for better directional control of the magnetic field flux lines.

In another aspect, some of the magnet sets of magnet sets 525 can be parallel, perpendicular, or at some other angle relative to magnet sets 515. In yet another aspect, magnet set 525-*a*, located on the left movement side of VMA 320, and magnet set 525-*c*, located on the right movement side of VMA 320, i.e., that is the left and right sides upon which VMA 320 moves, can be positioned at least as distant from magnet set 525-*b* as half of the length of PSA sub-assembly 110. Positioning magnet set 525-*a* and magnet set 525-*c* at least as this distance can improve the responsiveness of PSA sub-assembly 110 to movement by VMA 320. Various combinations of angles for each of the magnet sets in magnet sets 525 can be utilized to provide high tensile strength and high directional control of PSA sub-assembly 110.

Figure 7:
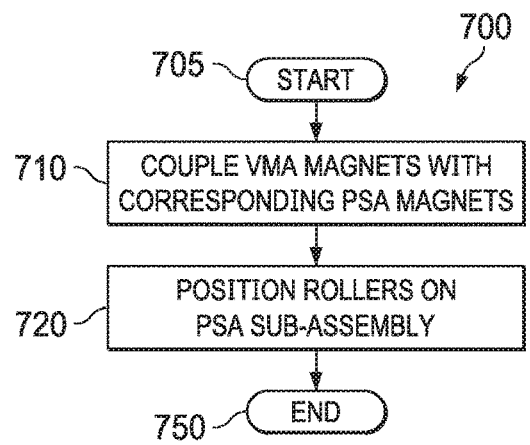
FIG. 7 is an illustration of a flow diagram of an example of a method of constructing a fluid control assembly using a PSA/VMA system.

FIG. 7 is an illustration of a flow diagram of an example of a method 700 to construct a fluid control assembly using a PSA/VMA system. Method 700 starts at a step 705 and proceeds to a step 710. In step 710 a set of VMA magnets are coupled with corresponding PSA magnets. The VMA and PSA magnets can be coupled together according to one or more aspects described herein. The set of VMA magnets can include one or more sets of magnets aligned to a corresponding set(s) of PSA magnets. Each set of magnets of the VMA and PSA can include one or more magnets. For example, there can be three sets of magnets in each of the VMA and PSA, located on a left end, right end, and center of the respective component. Each of the sets of magnets can include one or more magnets. The number of magnets in a corresponding set of PSA magnets can be a different number than in the set of VMA magnets.

The orientation of each of the sets of VMA magnets can be adjusted as well. For example, a portion of the set of VMA magnets can be moved further from the center magnet as compared to conventional alignments. A portion of the set of VMA magnets can be oriented parallel to a corresponding set of PSA magnets, oriented perpendicular to a corresponding set of PSA magnets, or a combination thereof. In addition, a portion of the set of VMA magnets can be angled so that the top surface facing the PSA can be angled toward a central point, e.g., the center, of the VMA. As such, some of the set of VMA magnets can be aligned along divergent axes that intersect a centerline of the VMA.

In a step 720, rollers are positioned on the PSA sub-assembly. The rollers allow the PSA sub-assembly to move utilizing a rolling mechanism instead of conventional slider mechanisms. There can be one or more rollers sets on the PSA sub-assembly. There can be at least two sets with one set mounted on each long end of the PSA sub-assembly. A sufficient number of rollers should be included to allow the PSA sub-assembly to move back and forth within the PSA housing while minimizing the PSA sub-assembly sliding across a surface within the PSA housing. Some sliding components can still be included, such as the electrical contacts with the ground and resistive electrical components. Increasing the number of rollers past the sufficient number can introduce additional friction points through the additional rollers. Using rollers instead of sliders can reduce the friction constraint experienced by the PSA sub-assembly and allow a greater degree of freedom in orienting the VMA magnets in various positions as described above.

When the fluid valve position is changed, the PSA sub-assembly will move proportionately to the movement of the VMA attached to the fluid valve. The resistance value created with the electrical circuit within the PSA, and modified by the position of the PSA sub-assembly within the PSA, can be utilized to compute the current position of the fluid valve. The current position can then indicate the approximate open position of the fluid valve.

The PSA can indicate the position of the PSA sub-assembly, or the computed fluid valve position, to other systems which can then determine the amount the fluid valve is opened. For example, the fluid valve controller assembly can use this information to determine whether it has reached the requested amount the fluid valve should be opened. The well site controller, engineer, or operator can utilize this information to verify the amount the fluid valve is opened. The method 700 ends at a step 750.

Figure 8A:
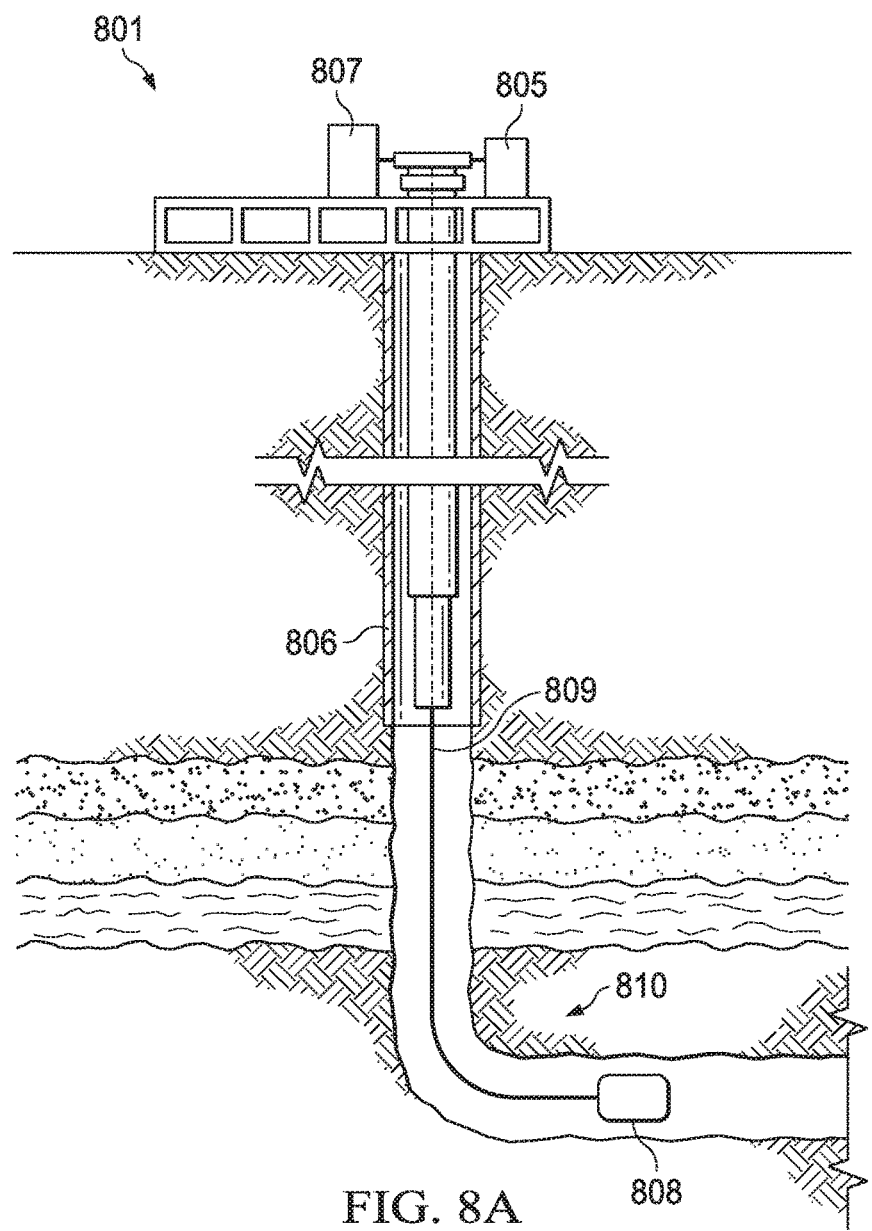
FIG. 8A is an illustration of a diagram of an example completion system.

FIG. 8A is an illustration of a diagram of an example completion system 801. Completion system 801 includes a pump system 805 and a well site controller 807. Well site controller 807 includes a processor and a memory and is configured to direct at least some operations of completion system 801. Extending below pump system 805 is a borehole 806 surrounded by subterranean formation 810. Tool pipe 809 is inserted into borehole 806. Located within borehole 806 is a fluid injection system 808.

Fluid injection system 808 further includes a VMA coupled to the fluid valve and a PSA sub-assembly magnetically coupled to the VMA, for example, PSA/VMA system 600 as shown in FIG. 6, and can be utilized to determine the amount the fluid valve is opened, as well as to measure the fluid volume moved within a tool or moved into and out of the tool. In other aspects, fluid injection system 808 can be replaced by a moving mechanism that can benefit from position monitoring. For example, a moving mechanism that can benefit from monitoring and verifying positions can be a centralizer arm (such as for wireline and MWD systems), a bent sub (such as angle extensions and extenders), a fluid injector (such as for wireline, MWD, and completion systems), a setting tool (such as for completion systems), and a shifting tool (such as for wireline and completion systems).

Figure 8B:
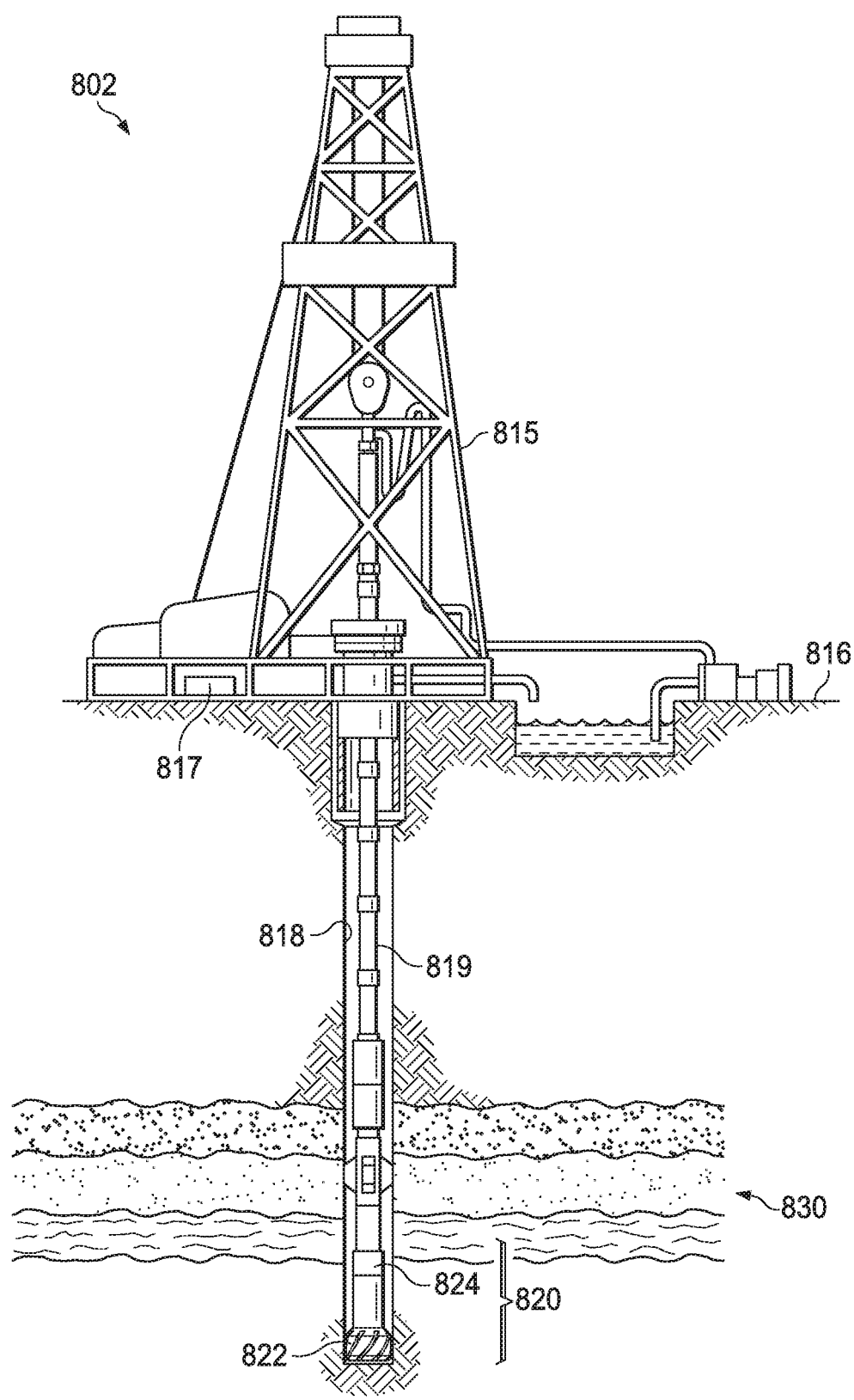
FIG. 8B is an illustration of a diagram of an example drilling well system.

FIG. 8B is an illustration of a diagram of an example drilling system 802, which can be a LWD, MWD, or other type of well system. Drilling system 802 includes a derrick 815 supporting drill string 819, and well site controller 817. Well site controller 817 includes a processor and a memory and is configured to direct operation of drilling system 802. Derrick 815 is located at a surface 816. Extending below derrick 815 is borehole 818 in which drill string 819 is inserted, where borehole 818 is surrounded by subterranean formation 830. Located at the bottom of drill string 819 is a downhole tool 820. Downhole tool 820 can include various bottom hole and downhole devices, such as a bottom hole assembly (BHA), a drill bit 822, and a fluid control valve system 824.

Fluid control valve system 824 includes a control valve fluidly coupled with a fluid pipe, a VMA, a PSA, and a transceiver, such as shown as PSA/VMA system 600 in FIG. 6. Other components of fluid control valve system 824 can be present, such as a local power supply, or batteries and capacitors to store power received from another system. Fluid control valve system 824 can be used as an outflow, such as when a drilling mud or an injection fluid are being released into the borehole, or an inflow, such as when drilling mud or hydrocarbons are being extracted from the borehole.

The VMA has a linear movement associated with the amount the fluid valve is opened, where the fluid valve can be between, including the end points, fully closed and fully opened. The VMA moves proportionally, using linear movement, to the amount the fluid valve is opened. The PSA can indicate the change in linear position of the VMA. The new position information can be communicated to one or more systems, for example, to the fluid valve so the fluid valve can stop the movement at the selected amount of opening and to well site controller 817. Well site operators or engineers can then verify the amount the fluid valve is opened.

The VMA is magnetically coupled to the PSA sub-assembly. As the VMA moves, the PSA sub-assembly is moved as well due to the magnetic force exerted on the PSA sub-assembly. The PSA can indicate the linear position and determine the relative amount the fluid valve is opened using its calibration parameters. In addition, the PSA can be used to measure the fluid volume moved within a tool or moved into and out of the tool. The PSA can be calibrated by moving the fluid valve to the fully closed position and then calibrating the PSA at that point. Well site controller 817 or well site operators or engineers, using the received data, can modify the well system job plan and further modify the amount the fluid valve is opened.

Figure 8C:
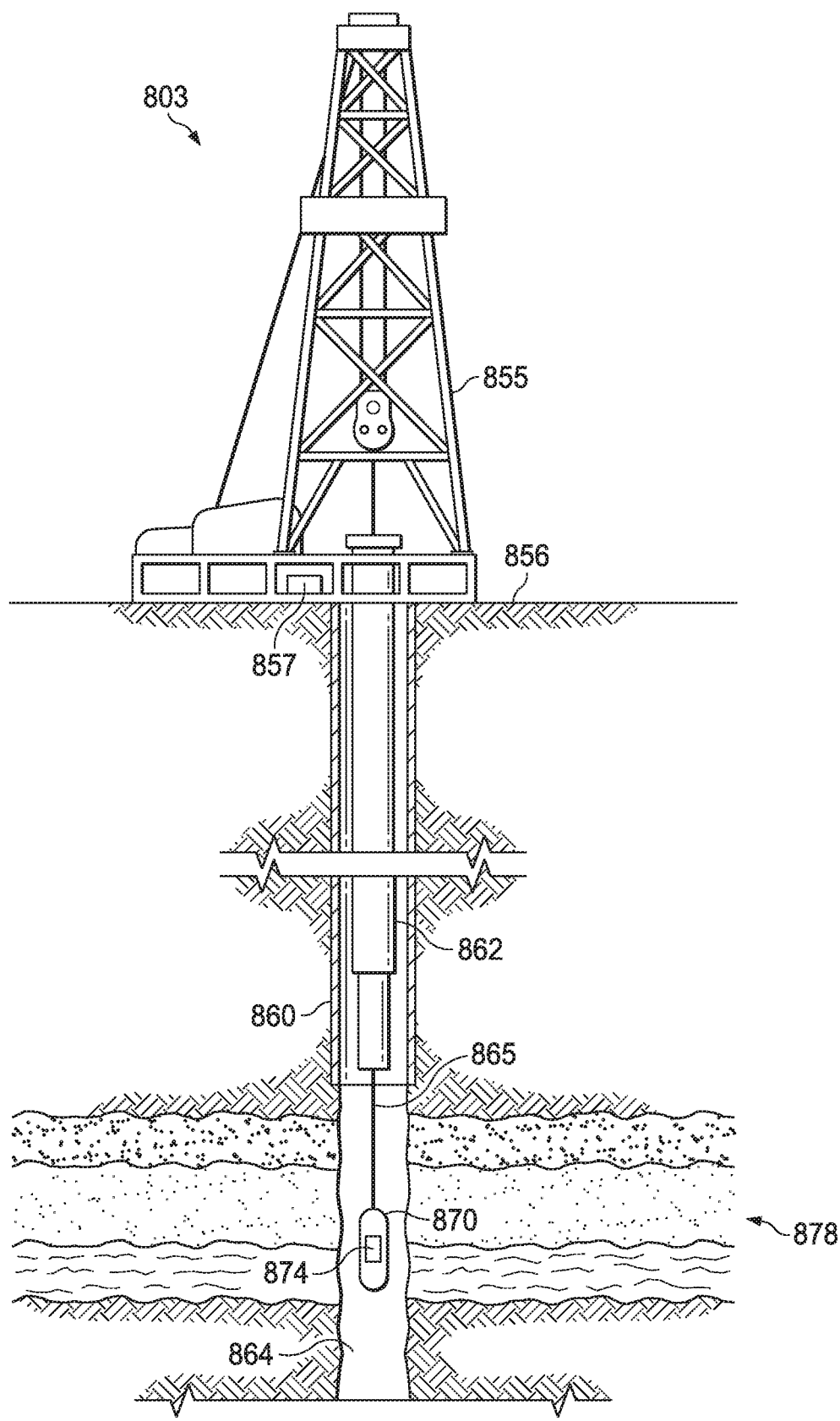
FIG. 8C is an illustration of a diagram of an example logging system.

FIG. 8C is an illustration of a diagram of an example logging system 803. Logging system 803 includes derrick 855 located at surface 856 and well site controller 857. The well site controller 857 includes a processor and a memory and is configured to direct operation of logging system 803. Below derrick 855 is borehole 860 that has two cased sections 862 and one uncased section 864, where borehole 860 is surrounded by subterranean formation 878. A wireline 865 is suspended in borehole 860 from derrick 855. A winch (not shown) can cooperate with the derrick 855 for lowering and raising of the wireline 865 in the borehole 860. At the lower end of wireline 865 are downhole tools 870 and a fluid control valve system 874 attached to a fluid system which, in some aspects, can be local to downhole tools 870. Fluid control valve system 874 can be the PSA/VMA system 600 demonstrated in FIG. 6.

Similar to FIG. 8B, fluid control valve system 874 further includes the VMA coupled to the fluid valve and the VMA magnetically coupled to the PSA sub-assembly, and can determine the amount the fluid valve is opened, as well as to measure the fluid volume moved within a tool or moved into and out of the tool. The results can be communicated to the fluid valve and to other systems.

Although FIGS. 8A, 8B, and 8C depict specific borehole configurations, those skilled in the art will understand that the disclosure is equally well suited for use in boreholes having other orientations including vertical boreholes, horizontal boreholes, slanted boreholes, and multilateral boreholes, and other borehole types. FIGS. 8A, 8B, and 8C depict an onshore operation. Those skilled in the art will understand that the disclosure is equally well suited for use in offshore operations.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects disclosed herein include:

A. An apparatus to indicate a position of a moving mechanism, including: (1) a PSA housing, (2) a PSA sub-assembly housed by the PSA housing, and (3) a roller set, attached to the PSA sub-assembly, wherein the roller se roller set comprises one or more rollers and enables the PSA sub-assembly to roll within the PSA housing.

B. A system to indicate an amount a fluid valve of a fluid control assembly is opened, including: (1) a VMA, operable to move proportionally with the fluid valve, using linear movement, wherein the fluid control assembly is located in a borehole of a well system, and (2) a PSA, operable to house a PSA sub-assembly that is magnetically coupled to the VMA, moves with respect to the VMA utilizing rollers, and indicates a position of the VMA.

C. A method of constructing a fluid control assembly for indicating a position of a fluid valve in a borehole, the method including: (1) coupling a set of VMA magnets with a set of PSA magnets, wherein the VMA moves proportionally with the fluid valve utilizing linear movement; and (2) positioning rollers on a sub-assembly of the PSA, wherein the VMA magnets and the PSA magnets are magnetically coupled and the rollers enable movement of the PSA sub-assembly to indicate a position of the fluid valve.

Each of aspects A, B, and C can have one or more of the following additional elements in combination: Element 1: a VMA capable to move proportionally with the moving mechanism utilizing linear movement, wherein the VMA is coupled to the moving mechanism and magnetically coupled to the PSA sub-assembly utilizing VMA magnets. Element 2: wherein at least one of the VMA magnets is aligned in parallel with respect to the PSA. Element 3: wherein at least one of the VMA magnets is perpendicularly aligned with respect to the PSA. Element 4: wherein the VMA magnets comprise: a first magnet set located proximate the center of the VMA, a second magnet set located on one side of the first magnet set, and a third magnet set located on an opposite side of the first magnet set from the second magnet set. Element 5: wherein the second magnet set and the third magnet set are located a distance at least half of a length of the PSA sub-assembly from the first magnet set. Element 6: wherein the second magnet set and the third magnet set are in a non-parallel alignment with the PSA. Element 7: wherein the second magnet set and the third magnet set are aligned along diverging axes. Element 8: further comprising a fourth magnet set located in the VMA and oriented perpendicular to the PSA. Element 9: wherein the roller set comprises two or more roller sets. Element 10: wherein the moving mechanism is a fluid control valve. Element 11: wherein the PSA sub-assembly further comprises a PSA magnet set, operable to form a magnetic coupling with the VMA; and a flux spacer, operable to direct and focus magnetic field flux lines of the PSA magnet set. Element 12: wherein the VMA further comprises a first VMA magnet set, operable to be magnetically coupled to a first member of the PSA magnet set, and located on one movement side of the VMA proximate the PSA, a second VMA magnet set, operable to be magnetically coupled to a second member of the PSA magnet set, and located on the opposite movement side of the VMA proximate the PSA, and a third VMA magnet set, operable to be magnetically coupled to a center flux spacer of the PSA sub-assembly, and located in a center of the VMA proximate the PSA. Element 13: wherein the first VMA magnet set is oriented parallel to the first member of the PSA magnet set and the second VMA magnet set is oriented parallel to the second member of the PSA magnet set. Element 14: wherein the first VMA magnet set is oriented perpendicular to the first member of the PSA magnet set and the second magnet set is oriented perpendicular to the second member of the PSA magnet set. Element 15: wherein a first top surface of the first VMA magnet set and a second top surface of the second magnet set are angled toward the third magnet set. Element 16: wherein the VMA further comprises a fourth magnet set oriented perpendicular to a fourth member of the PSA magnet set. Element 17: wherein the coupling the set of VMA magnets further comprises positioning one or more of the VMA magnets perpendicular to a corresponding set of PSA magnets. Element 18: wherein the coupling the set of VMA magnets further comprises positioning one or more of the VMA magnets at an angle relative to an orientation of one or more of a corresponding set of PSA magnets, where the angle causes a top surface of the one or more VMA magnets to tilt toward a center magnet set of the VMA magnets. Element 19: wherein the coupling the set of VMA magnets further comprises positioning a left movement side VMA magnet set and a right movement side VMA magnet set from a center VMA magnet set a distance that is at least a half of a length of the PSA.

What is claimed is:

1. A system to indicate an amount a fluid valve of a fluid control assembly is opened, comprising:
    a valve magnetic assembly (VMA), operable to move proportionally with the fluid valve, using linear movement, wherein the fluid control assembly is located in a borehole of a well system, and where a first top surface of a first VMA magnet set of the VMA and a second top surface of a second VMA magnet set of the VMA are angled toward a third VMA magnet set of the VMA; and
    a position sensor assembly (PSA), operable to house a PSA sub-assembly that is magnetically coupled to the VMA, moves with respect to the VMA utilizing rollers, and indicates a position of the VMA.

2. The system as recited in claim 1, wherein the PSA sub-assembly further comprises:
    a PSA magnet set, operable to form a magnetic coupling with the VMA; and
    a flux spacer, operable to direct and focus magnetic field flux lines of the PSA magnet set.

3. The system as recited in claim 2, wherein
    the first VMA magnet set is operable to be magnetically coupled to a first member of the PSA magnet set, and located on one movement side of the VMA proximate the PSA,
    the second VMA magnet set is operable to be magnetically coupled to a second member of the PSA magnet set, and located on the opposite movement side of the VMA proximate the PSA, and
    the third VMA magnet set is operable to be magnetically coupled to a center flux spacer of the PSA sub-assembly, and located in a center of the VMA proximate the PSA.

4. The system as recited in claim 3, wherein the first VMA magnet set is oriented parallel to the first member of the PSA magnet set and the second VMA magnet set is oriented parallel to the second member of the PSA magnet set.

5. The system as recited in claim 3, wherein the first VMA magnet set is oriented perpendicular to the first member of the PSA magnet set and the second VMA magnet set is oriented perpendicular to the second member of the PSA magnet set.

6. The system as recited in claim 3, wherein the VMA further comprises:
    a fourth VMA magnet set oriented perpendicular to a fourth member of the PSA magnet set.

7. A method of constructing a fluid control assembly for indicating a position of a fluid valve in a borehole, the method comprising:
    coupling a set of valve magnetic assembly (VMA) magnets, of a VMA, with a set of position sensor assembly (PSA) magnets, wherein the VMA moves proportionally with the fluid valve utilizing linear movement, and one or more VMA magnets in the set of VMA magnets are positioned at an angle, where the angle causes a top surface of the one or more VMA magnets to tilt toward a center magnet set of the set of VMA magnets; and
    positioning rollers on a sub-assembly of the PSA, and the rollers enable movement of the PSA sub-assembly to indicate a position of the fluid valve.

8. The method as recited in claim 7, wherein the coupling the set of VMA magnets further comprises:
    positioning one or more VMA magnets, in the set of VMA magnets, perpendicular to a corresponding one or more PSA magnets.

9. The method as recited in claim 7, wherein the coupling the set of VMA magnets further comprises:
    positioning a left movement side VMA magnet set and a right movement side VMA magnet set from a center VMA magnet set a distance that is at least a half of a length of the PSA, where the left movement side VMA magnet set, the right movement side VMA magnet set, and the center VMA magnet set are part of the set of VMA magnets.

* * * * *